United States Patent [19]
Bentley et al.

[11] Patent Number: 6,054,072
[45] Date of Patent: Apr. 25, 2000

[54] INFRARED BONDING OF TRANSPARENT PLASTICS ARTICLES

[75] Inventors: Andrew Leonard Bentley, Grand Blanc; Kelvin Jay Bennett, Techumseh, both of Mich.

[73] Assignee: Ford Motor Company, Dearborn, Mich.

[21] Appl. No.: 09/222,163

[22] Filed: Dec. 29, 1998

[51] Int. Cl.[7] .................................................. B29D 11/00
[52] U.S. Cl. .................. 264/1.9; 156/272.2; 156/273.3; 156/275.1; 156/379.8; 264/492; 264/493; 264/248; 264/249
[58] Field of Search ........................... 264/1.9, 492, 493, 264/248, 249, 1.7, 1.1; 156/272.2, 379.8, 273.3, 275.1, 275.7; 425/174.4

[56] References Cited

U.S. PATENT DOCUMENTS

| | | |
|---|---|---|
| 3,975,618 | 8/1976 | Goos et al. ............................. 264/492 |
| 4,151,976 | 5/1979 | Schurman . |
| 4,340,139 | 7/1982 | Wilcox et al. . |
| 4,343,412 | 8/1982 | Wilcox et al. . |
| 4,382,058 | 5/1983 | Watson et al. . |
| 4,486,164 | 12/1984 | Wilkie et al. . |
| 4,486,379 | 12/1984 | Wilkie et al. . |
| 4,487,328 | 12/1984 | Wilcox et al. . |
| 4,615,464 | 10/1986 | Byrns . |
| 5,151,149 | 9/1992 | Swartz . |
| 5,413,743 | 5/1995 | Prophet ..................................... 264/1.9 |
| 5,522,954 | 6/1996 | Bennett et al. . |
| 5,564,586 | 10/1996 | Goodwin . |
| 5,840,147 | 11/1998 | Grimm ................................ 156/272.2 |

FOREIGN PATENT DOCUMENTS

| | | | |
|---|---|---|---|
| 337 776 | 10/1989 | European Pat. Off. ............ | 156/272.2 |
| 895 690 | 1/1982 | U.S.S.R. .............................. | 156/272.2 |

*Primary Examiner*—Mathieu D. Vargot
*Attorney, Agent, or Firm*—Damian Porcari

[57] ABSTRACT

A method for infrared bonding a transparent plastic article having a first surface and a transparent bonding surface to an opaque plastic article having an opaque bonding surface. The method includes the following steps: The transparent article is aligned with the opaque article. The transparent bonding surface is juxtaposed the opaque bonding surface. An infrared beam is directed through the transparent article. The infrared beam is focused on the opaque bonding surface and causes the opaque bonding surface to heat and soften. The transparent article is contacted with the opaque article. The transparent and opaque bonding surfaces are urged together. The transparent and opaque bonding surfaces are fuse together.

10 Claims, 3 Drawing Sheets

INFRARED BONDING OF TRANSPARENT PLASTICS ARTICLES

BACKGROUND OF THE INVENTION

1. Field of the Invention

The present invention relates to bonding a transparent plastic article to an opaque plastic article. More specifically, the present invention is directed to a method of bonding a transparent article to an opaque article by directing an infrared beam through the transparent article to heat and soften the opaque article.

2. DESCRIPTION OF THE RELATED ART

Most automotive lens assemblies are manufactured using a clear lens and an opaque reflector. The reflector may be metallized to increase the reflectivity and the performance of the assembly. The lens and reflector are joined by placing an adhesive between mating surfaces. The adhesive generally fills a U-shaped groove in one of the components. A projecting tongue is placed within the groove. The adhesive bonding process described is sufficient to provide a leak-free attachment of the lens to the reflector. There are several disadvantages to using an adhesive between the transparent and opaque members. The adhesive is costly and difficult to apply. It must be carefully dispensed so as not produce areas that are too thick and became squeezed into the reflector or too thin and provide insufficient material to join the components. Also, the adhesives require a period of time to cure. Generally, the lens and reflector must be urged together while the adhesive cures thus increasing the manufacturing cycle time. It is generally desirable to provide a method of attaching the transparent lens to the reflector without the need for adhesives or sealant.

Another method of securing a lens to a reflector is described in commonly assigned U.S. patent application Ser. No. 09/174,611, filed Oct. 19, 1998, titled "METHOD AND APPARATUS FOR MANUFACTURING A TWO-PIECE PLASTIC ASSEMBLY" and incorporated herein by reference. This patent application teaches joining two plastic articles by injecting a plastic between the two components. The injected plastic fuses to and joins the components in a mold. This process utilizes the injected plastic to join and seal the lens and reflector. The present invention is designed to join and seal the lens and reflector without the additional plastic sealing material.

Several processes exist to join plastic articles without adhesives or plastic sealers. Among them are methods such as hot air bonding, sonic welding, vibration welding, mechanical fasteners and infrared radiant heat.

One method in particular, infrared (IR) radiant heat, has certain advantages over the other types. Generally, there is a desire to form a strong bond between the two parts quickly and at a minimal cost. Additionally, it is preferable that the bonding process avoids touching the surfaces to be bonded themselves where they are to be bonded in order to assure uniform bonds from part to part and to reduce the cost of cleaning the bonding apparatus. Further, in many instances, it is preferable that there be no marring or distortion of the surface on the opposite side from that which is bonded, herein referred to as the viewing surface.

Infrared bonding in general can overcome many of these concerns. Infrared energy can be finitely pinpointed with a focal point or a mask to the exact area to be bonded in order to avoid overheating the plastic in adjacent areas that might cause unwanted distortion in the part. Infrared can heat the bonding surface to a high temperature; thus assuring a strong bond is formed between the two parts. The bonding surface can be heated very quickly with infrared and the timing and amount of heat application can be precisely controlled. Further, with infrared heating, there need be no contact between the heat source and the bonding surfaces of the parts, in order to minimize cleaning requirements for the tooling.

One method of bonding two opaque articles is described in commonly assigned U.S. Pat. No. 5,522,954 ('954), issued Jun. 4, 1996, and incorporated herein by reference. This patent teaches a method of heating two opaque surfaces using an infrared heat source that produces low and high heating. The use of varied heating precluded damaging the articles by the heat of the infrared beam. This method has been successfully used for bonding opaque parts that are directly exposed to the infrared beam. The '954 patent does not describe the present process of passing an IR beam through a material that is transparent to the heating effects of the IR beam.

Other patents also describe various methods of bonding articles using infrared heating. U.S. Pat. No. 5,151,149 to Swartz discloses a method and apparatus for heating plastic for bonding using infrared, which attempts to heat the plastic fairly quickly up to its bonding temperature while avoiding burning the viewing surfaces. It discloses using infrared focused heat sources that move rapidly in repeated patterns to heat the plastic at a given point a little more on each pass.

Accordingly, it is desirable to infrared bond plastic parts that have been assembled without the need for adhesives or sealers. It is also desirable to join plastic parts while having access to only one surface of the assembly.

SUMMARY OF THE INVENTION

The present invention is directed to a method for infrared bonding a transparent plastic article having a first surface and a transparent bonding surface to an opaque plastic article having an opaque bonding surface. The method includes the following steps. The transparent article is aligned with the opaque article. The transparent bonding surface is juxtaposed the opaque bonding surface. An infrared beam is directed through the transparent article. The infrared beam is focused on the opaque bonding surface and causes the opaque bonding surface to heat and soften. The transparent article is contacted with the opaque article. The transparent and opaque bonding surfaces are urged together. The transparent and opaque bonding surfaces then fuse together and form the assembly.

The method of the present invention also includes focusing the beam to a focal point and causing the focal point to heat the opaque bonding surface. The focal point may be adjusted to provide an effective heating as the transparent and opaque articles are urged together. The focal point may be adjusted by changing the focal length of the beam or by moving the beam with respect to the article.

The transparent bonding surface is designed to soften and receive the transparent bonding surface. The opaque bonding surface may be made to either have an extending projection or a non-projecting surface that receives a mating transparent bonding surface.

The invention enables the transparent and opaque articles to be bonded without the need for adhesives or sealants. The transparent and opaque articles are brought together in a fixture. The fixture removes any warpage that remains in the articles. The articles are joined after they have been precisely aligned and straightened. The articles are joined by fusing the opaque and transparent bonding surfaces. The joining operation only requires access to one surface of the assembly and occurs after the articles have been mated and precisely positioned. This improves the quality of the final assembly because the articles are brought together prior to the bonding operation.

It is an advantage of the present invention to provide a method of joining a transparent and opaque article without the need for adhesives or sealers. It is also desirable to provide an easily manufacturable method of securing a transparent and opaque article while the two components are aligned in a fixture. It is further desirable to provide a method of joining two plastic articles by IR bonding while having access to only one surface of the assembly. These and other objects, features and advantages of the present invention will become more apparent to those of ordinary skills in the art upon reference to the attached drawings and following description.

DETAILED DESCRIPTION OF THE PREFERRED EMBODIMENTS

Figure 1:
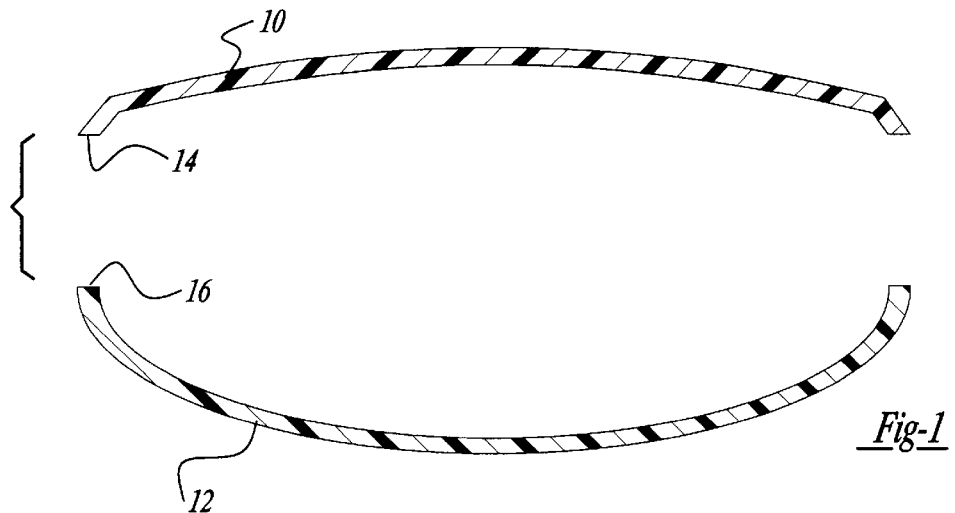
FIG. 1 is a cross-sectional view of a transparent lens and opaque reflector.

The invention as illustrated FIGS. 1–6 teaches a method of manufacturing an automotive lamp assembly. While the invention will be described and illustrated as an automotive lens and reflector, any transparent article that allows IR radiation to pass through it may be bonded to an opaque plastic article that heats and softens when exposed to IR radiation, and is included within the scope of the invention described.

The following items are a word list of the items described in the drawings and are reproduced to aid the understanding the invention;

10 lens
12 reflector
14 lens mating surface
16 reflector mating surface
18 fixture
20 platen
22 lens surface
24 cross member
26 IR source
28 IR beam
30 ram
32 controller
34 focal point
36 projection
38 side surfaces
40 end surface
42 projection
44 side surfaces
46 end surface
48 focusing lens Illustrated in FIG. 1 is a cross-sectional view of a transparent lens 10 and reflector 12. The lens 10 is made from a clear plastic material that is transparent to IR radiation. Suitable materials include polycarbonate, acrylic and glass. Transparent materials may be, but need not be clear. Transparent materials allow IR radiation to pass to the layer beneath. These materials may be heated by the IR radiation, but do not absorb or reflect all of the IR beam. The opaque material may be any polymeric material that is heated and softened by IR radiation including polycarbonate, ABS, and nylon.

The lens 10 has a mating surface 14 and the reflector 12 has a mating surface 16. The mating surfaces 14 and 16 mate and form a continuous seal therebetween after bonding. The mating surfaces 14 and 16 are sometimes formed with an irregular or warped shape. These irregularly shaped parts do not mate unless they are urged together as will be described below.

Figure 2:
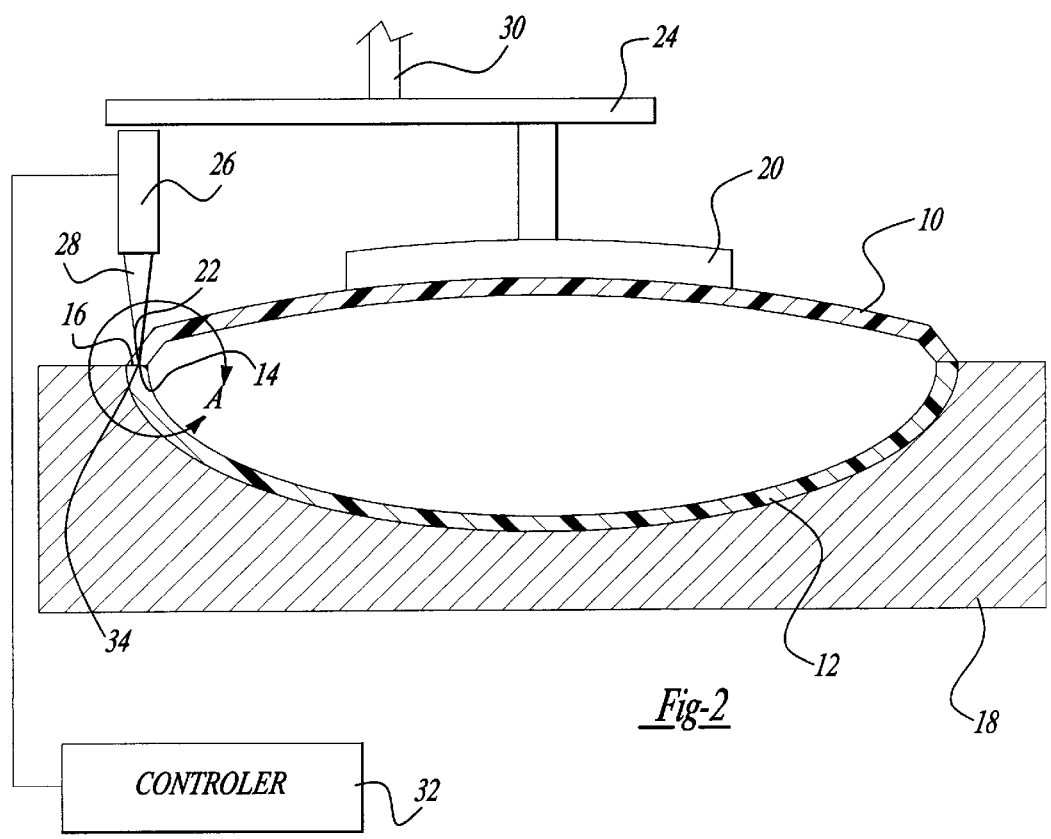
FIG. 2 is a cross-sectional view of the lens and reflector placed in a fixture and undergoing IR bonding.

The reflector 12 is placed within a fixture 18 as shown in FIG. 2. The fixture 18 retains and positions the reflector 12 to receive the lens 10. The lens 10 is positioned atop the reflector 12. The mating surfaces 14, 16 are aligned and the lens 10 and reflector 12 are brought together. A platen 20 urges the lens 10 against the reflector 12. The platen 20 causes the lens and reflector to straighten and mate properly. The platen 20 leaves exposed a lens surface 22. The lens surface 22 directly overlies the lens mating surface 14.

The platen 20 is connected to a cross member 24. The member 24 supports the platen and an IR radiation source 26. The IR radiation source 26 may be any type of IR source including commercially available lamps with parabolic/elliptical reflectors. The IR source 26 is preferably infrared heat bulbs having tungsten filaments and integral parabolic reflectors. IR source 26 is mounted to the member 24 so that an IR beam 28 is projected onto the lens surface 22. The member 24 is secured to a movable ram 30 and urges the lens 10 against the reflector 12. The IR source 26 generally moves with the member 24 and the focal point of the beam 34 moves with the lens 10.

The IR source 26 may optionally include lenses (not shown) that vary the focal point 34 of the beam 28. The IR source 26 is generally positioned and tuned to project an IR beam 28 that passes through the lens 10 and onto the reflector mating surface 16. An operator station (not shown) includes a controller 32, which can be comprised of conventional relay logic, programmable logic and/or a computer. It will control the timing, amount and direction of movement of ram 30, and also the timing and intensity of power sent to the IR source 26. Preferably, a programmable logic controller controls the power input to the IR source 26.

The process of bonding plastic parts together will now be described. Joining of the lens 10 and reflector 12 to each other is effected by application of IR radiation through the lens surface 22. The beam 28 is focused to produce an intense heat at the focal point 34. A vacuum holds the lens 10 in the platen 20 and the reflector 12 is placed within the fixture 18. The vacuum and fixture hold the parts securely in place to assure proper alignment when bonded.

Figure 3:
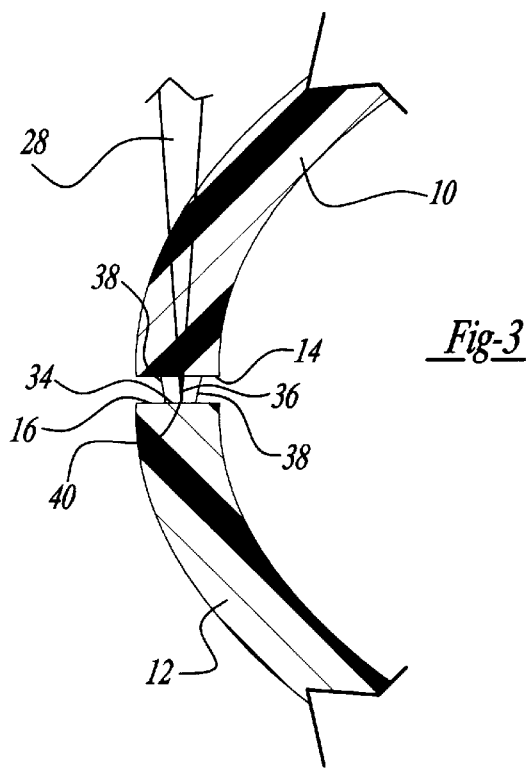
FIG. 3 is a cross-sectional first embodiment of the invention illustrating an enlarged view of the area marked A in FIG. 2.
Figure 4:
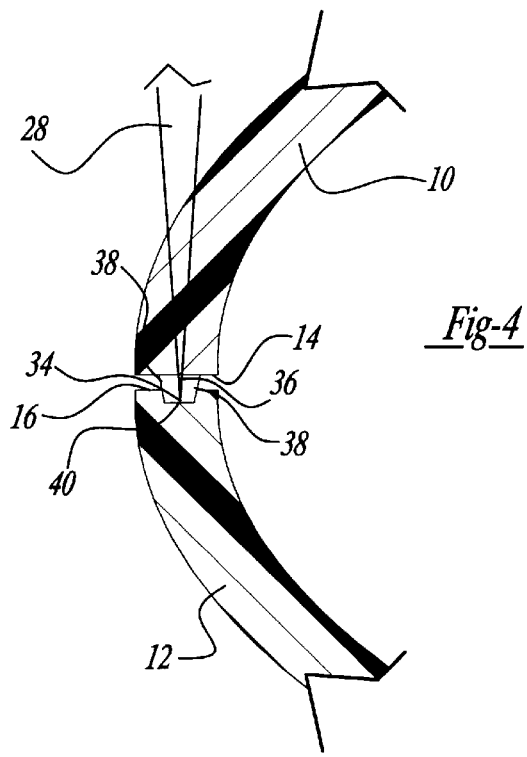
FIG. 4 is the cross-sectional view illustrated in FIG. 3 undergoing IR bonding.

After the lens 10 and the reflector 12 are secured in place, the controller 32 will send a signal activating the IR source 26. The IR source 26 creates the beam 28 as shown in FIG. 3. The focal point 34 falls on the reflector mating surface 16. In the embodiment illustrated in FIG. 3, the lens matting surface 14 includes a projection 36. The projection 36 includes side surfaces 38 and end surface 40. The IR beam 28 heats and softens the reflector surface 16. The lens 10 is urged against the reflector 12 and the projection 36 penetrates into the softened plastic material as shown in FIG. 4. The plastic material from the reflector 12 adheres to the side surfaces 38 and the end surface 40.

The focal point 34 moves with the end surface 40 to heat and soften the inner areas of the reflector mating surface 16. By attaching the IR source and platen to the cross member 24, the movement of the lens 10 and the focal point 34 may be coordinated with the movement of the ram 30.

While only one IR source 26 is illustrated, multiple IR sources 26 may be used to illuminate different areas of the lens surface 22. Additionally, the IR source 26 may be traversed along a line over the lens surface 22 to heat an elongated area. Further, a cylindrical lens may be used to project a line of light to heat an elongated area.

Figure 5:
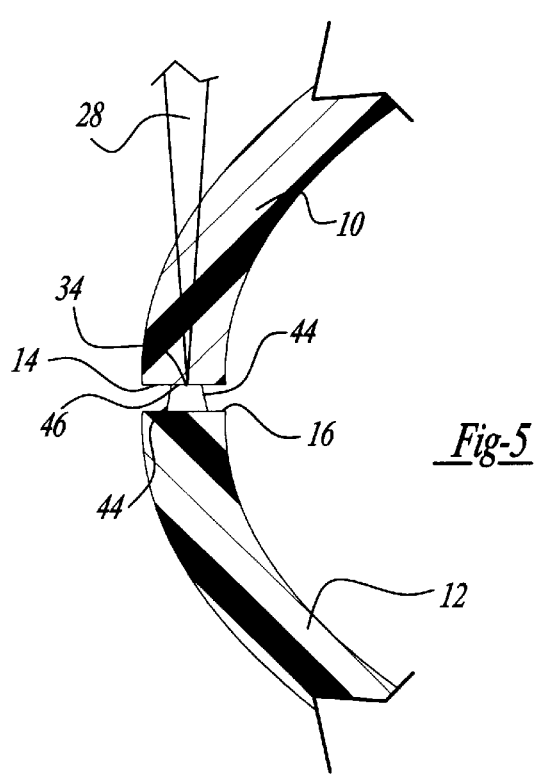
FIG. 5 is a cross-sectional second embodiment of the invention illustrating an enlarged view of the area marked A in FIG. 2.

In the alternative embodiment of the invention illustrated in FIG. 5, the lens mating surface 14 is flat and the reflector mating surface 16 includes a projection 42. The projection 42 includes side surfaces 44 and an end surface 46. The focal point 34 is focused on the end surface 46 and causes the projection to heat and soften. The lens mating surface 14 is urged against the softened projection 46 and fuse as described above.

Figure 6:
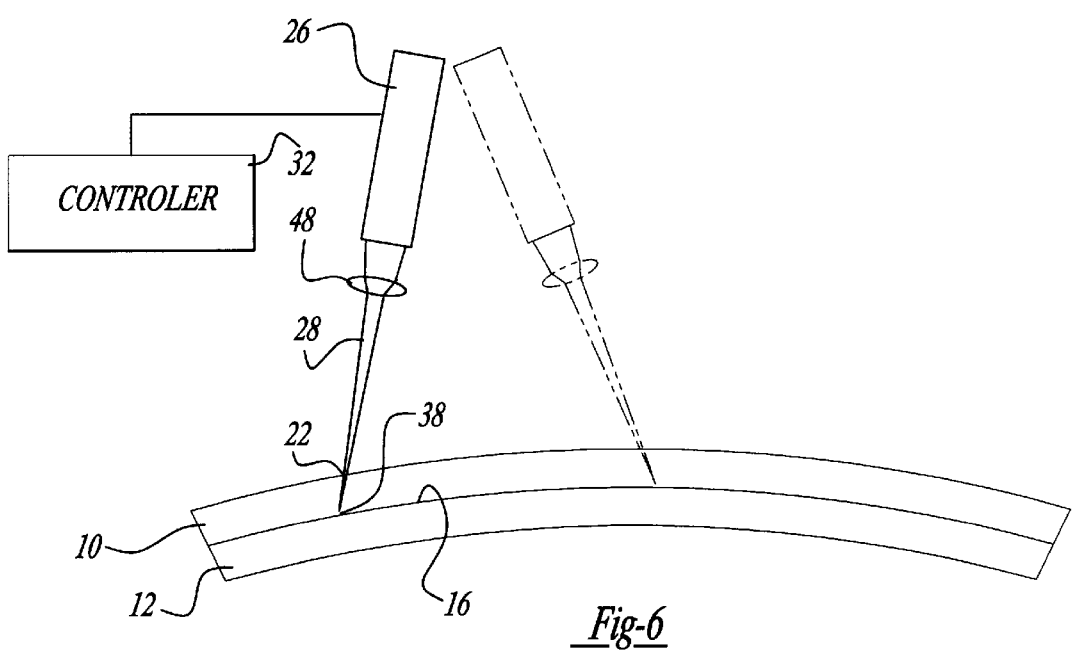
FIG. 6 is a side view of a third embodiment of the invention illustrating the use of a focusing lens.

The invention may also utilize a focusing lens 48 placed in front of the IR source 26 to focus the beam 28 on the reflector-mating surface 16 as shown in FIG. 6. This enables the IR source 26 to be mounted to a stationary source to reduce shock to the system. The focusing lens 48 may also be used to focus the beam 28 along the lens surface 22 if the IR source is pivoted to illuminate an elongated area. In this way, one or more IR sources 26 could be mounted above the lens surface 22 and swiveled to project the beam 28 around an elongated lens surface 22. The focal point 34 of the beam could be focused to fall on the reflector-mating surface 16 as the focal length changes. The controller 32 may control the movement of the IR source 26 and the focal length of the beam 28.

Optionally, the output of the IR source 26 may be varied as described in U.S. Pat. No. 5,522,954 to avoid over heating any area of the reflector mating surface 16.

While certain embodiments of the present invention have been described in detail, those familiar with the art to which this invention relates will recognize various alternative designs and embodiments for practicing the invention as defined by the following claims.

What is claimed is:

1. A method for infrared bonding a transparent plastic article having a first surface and a transparent bonding surface to an opaque plastic article having an opaque bonding surface comprising the steps of:

locating said transparent article in alignment with said opaque article, said transparent bonding surface juxtaposed said opaque bonding surface;

directing an infrared beam through said transparent plastic article;

focusing said infrared beam to a focal point on said opaque bonding surface and causing said opaque bonding surface to heat and soften;

contacting said transparent plastic article with said opaque article;

urging said transparent and opaque bonding surfaces together and causing said transparent and opaque bonding surfaces to fuse together; and adjusting the focal point of said beam to continually contact the opaque bonding surface as said transparent and opaque articles are urged together.

2. The method according to claim 1, wherein said transparent bonding surface includes a shoulder portion and a projecting portion and said projecting portion penetrates said opaque bonding surface.

3. The method according to claim 1, wherein said opaque bonding surface includes a shoulder portion and a projecting portion and said projecting portion is deformed by contact with said transparent bonding surface.

4. The method according to claim 1, further comprising an infrared light source and a focusing lens producing said beam and said focal point is adjusted by moving said focusing lens with respect to said light source to change the focal length of said beam.

5. The method according to claim 1, further comprising an infrared light source and said focal point is adjusted by moving said light source with respect to said opaque bonding surface.

6. A method for manufacturing an automotive lens assembly having a transparent plastic lens and an opaque plastic reflector comprising the steps of:

locating said lens in alignment with said reflector, said lens having a transparent bonding surface juxtaposed an opaque bonding surface on said reflector;

directing an infrared beam through said lens, said beam entering a surface opposite said transparent bonding surface;

focusing said infrared beam to a focal point on said opaque bonding surface and causing said opaque bonding surface to heat and soften;

contacting said lens and reflector; po1 urging said lens and reflector together and causing said transparent and opaque bonding surfaces to fuse, whereby said lens is bonded to said reflector without the need for adhesives; and adjusting the focal point of said bean to continually contact the opaque bonding surface as said transparent and opaque articles are urged together.

7. The method according to claim 6, wherein said transparent bonding surface includes a shoulder portion and a projecting portion and said projecting portion penetrates said opaque bonding surface.

8. The method according to claim 6, wherein said opaque bonding surface includes a shoulder portion and a projecting portion and said projecting portion is deformed by contact with said transparent bonding surface.

9. The method according to claim 6, further comprising an infrared light source and a focusing lens producing said beam and said focal point is adjusted by moving said focusing lens with respect to said light source and to change the focal length of said beam.

10. The method according to claim 6, further comprising an infrared light source and said focal point is adjusted by moving said light source with respect to said opaque bonding surface.

* * * * *